(No Model.)

W. M. MORDEY.
DYNAMO ELECTRIC MACHINE.

No. 312,745.

Patented Feb. 24, 1885.

Witnesses:
J. H. Blackwood
L. A. Swartzell

Inventor:
William Morris Mordey
By W. H. Doolittle
attorney (No Model.) 7 Sheets—Sheet 3.

W. M. MORDEY.
DYNAMO ELECTRIC MACHINE.

No. 312,745. Patented Feb. 24, 1885.

Witnesses:
J. M. Blackwood
L. A. Swartzell

Inventor:
William Morris Mordey
By W. A. Doolittle
attorney (No Model.) 7 Sheets—Sheet 4.

W. M. MORDEY.
DYNAMO ELECTRIC MACHINE.

No. 312,745. Patented Feb. 24, 1885.

Witnesses:
J. H. Blackwood
L. A. Swartzell

Inventor:
William Morris Mordey
By W. H. Doolittle
Attorney (No Model.) 7 Sheets—Sheet 5.

W. M. MORDEY.
DYNAMO ELECTRIC MACHINE.

No. 312,745. Patented Feb. 24, 1885.

Witnesses:
J. K. Blackwood
L. A. Swartzell

Inventor:
William Morris Mordey
By W. H. Doolittle
Attorney (No Model.)  7 Sheets—Sheet 6.

W. M. MORDEY.
DYNAMO ELECTRIC MACHINE.

No. 312,745. Patented Feb. 24, 1885.

Witnesses:
J. M. Blackwood
L. A. Swartzell

Inventor:
William Morris Mordey
By W. A. Doolittle
attorney (No Model.) 7 Sheets—Sheet 7.

W. M. MORDEY.
DYNAMO ELECTRIC MACHINE.

No. 312,745. Patented Feb. 24, 1885.

Witnesses:
J. K. Blackwood
L. A. Swartzell

Inventor:
William Morris Mordey
By W. H. Doolittle
attorney

UNITED STATES PATENT OFFICE.

WILLIAM MORRIS MORDEY, OF PUTNEY, COUNTY OF SURREY, ENGLAND.

DYNAMO-ELECTRIC MACHINE.

SPECIFICATION forming part of Letters Patent No. 312,745, dated February 24, 1885.

Application filed November 5, 1883. (No model.) Patented in England January 24, 1883, No. 400, and September 15, 1883, No. 4,419, and in Belgium October 2, 1883, No. 62,765.

*To all whom it may concern:*

Be it known that I, WILLIAM MORRIS MORDEY, a subject of the Queen of Great Britain and Ireland, residing at Putney, in the county of Surrey, Kingdom of Great Britain and Ireland, have invented a new and useful Improved Dynamo-Electric Machine, (for part of which I have obtained a patent in Great Britain, No. 400, bearing date January 24, 1883,) of which the following is a specification.

In an improved dynamo-electric machine according to my invention, I build up the core of the armature, which, according to my invention is of the ring-disk type, of a number of plates separated from each other by non-conducting material. I not only separate the parts forming the core of the armature magnetically, but also electrically, and to this end I insulate all the bolts or rivets by which the said parts are connected together, or I form them of non-conducting material, and thus I obviate to a great extent the generation of Foucault currents. For the magnetic field I employ, according to circumstances, two, four, six, eight, or any convenient even number of magnetic poles, arranged alternately north and south, and to reduce the number of collecting-brushes at the armature, I connect the coils of the armature which are in the same phase of excitation, and are therefore equipotential, or the corresponding segments of the commutator, or both by cross-connections, and by this means I am enabled to dispense with all the brushes except one pair.

Referring to the accompanying sheets of drawings, Figs. 7, 8, and 9 show diagrammatically the connections between the armature-coils and the commutator when the field-magnets have four, six, and eight poles, respectively.

Figure 1:
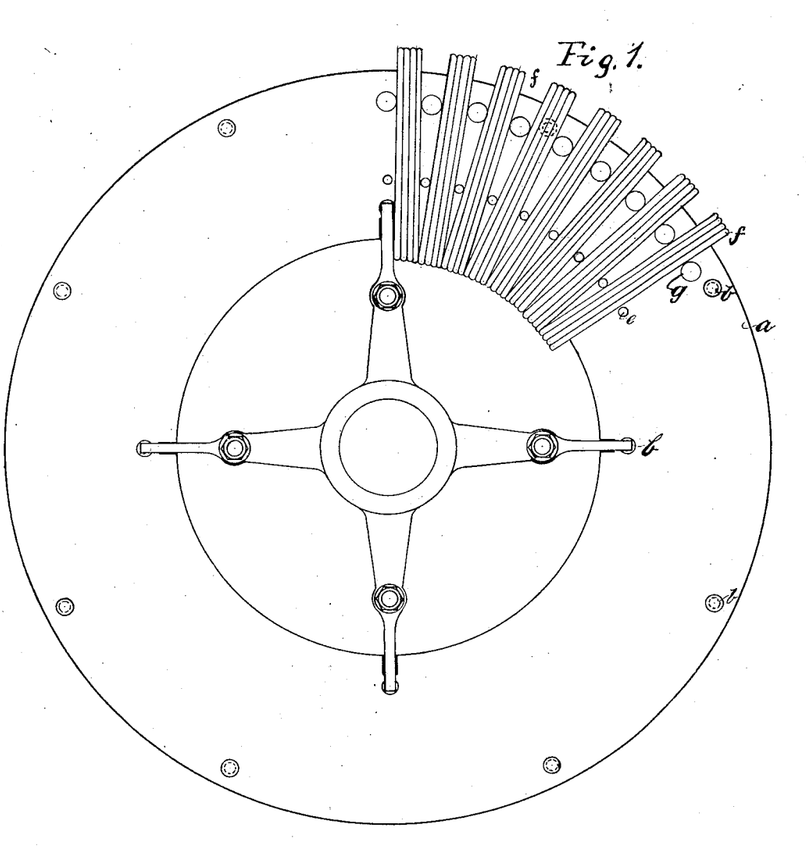
Figure 1 is an elevation of the partly-wound core of the armature of a dynamo-machine according to my invention.
Figure 2:
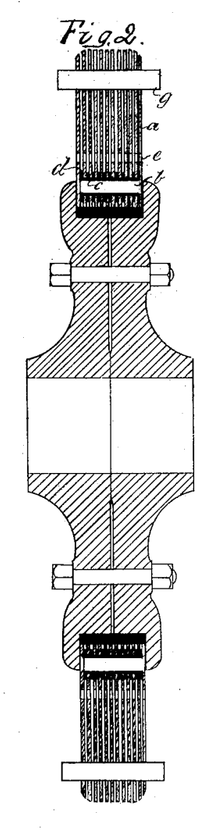
Fig. 2 is a section of the same.

A number of thin iron disks or plates, *a a*, Figs. 1 and 2, are placed side by side, and connected by means of brass or other non-magnetic bolts or rivets *b b*, passing through tubes or bushes *c c*, of wood or other suitable insulating non-magnetic material. The bushes and bolts pass through washers *d d* of an insulating substance (mica being a suitable material) for the purpose of slightly separating the plates from each other, thus leaving air-spaces between the plates. To facilitate air-circulation through these spaces I sometimes drill holes *e e* through the ring-disk at intervals, leaving these holes open to the external air. The use of metallic bolts or rivets *b b*, which are used only for strength, may be dispensed with where the size of the armature is such that sufficient strength can be obtained without them, and screwed bolts of lignum-vitæ or other dense unyielding non-conducting material may be substituted. The armature-core is wound with numerous coils of wire in such a manner that the convolutions of each coil *f f*, Fig. 1, are nearly or quite parallel to each other; but the center convolution of each of the coils is radial, the coils being close together at the inner periphery of the ring, but slightly separated toward the outer periphery.

For the purpose of supporting the coils and for convenience of winding, I fix pegs *g g* of wood or other suitable insulating material through the ring-disk near its outer circumference, so that they project from the sides of the ring-disk and are flush with the outer surface of the coils. Sometimes after the winding is completed, I withdraw these pegs, thus availing myself of the holes to obtain increased air-circulation.

Figure 5:
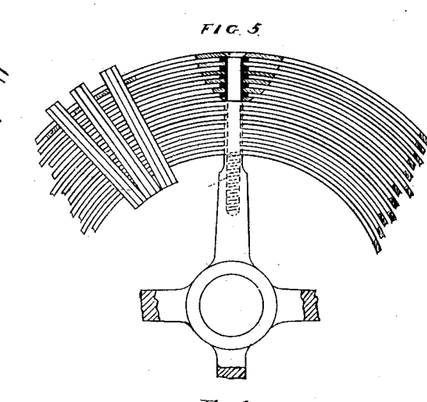
Figs. 5 and 6, detail views of the core of the armature.

It will be seen on reference to Figs. 1 and 2 that the iron is laminated, and the plates are electrically insulated in planes at right angles to the axis of the ring. As, however, the field-magnet pole-pieces P P, as shown in the drawings, are constructed to act directly on the sides of the armature as well as on its periphery, it will be observed that to most effectually check the generation of Foucault currents in the core of the armature when the machine is of the construction here illustrated, the lamination of the iron should be principally parallel to the axis of the armature—that is to say, the division of the iron should be chiefly perpendicular to the wire passing over the sides of the ring-disk. For these reasons I sometimes construct the armature as shown in Figs. 3 and 5.

Figure 3:
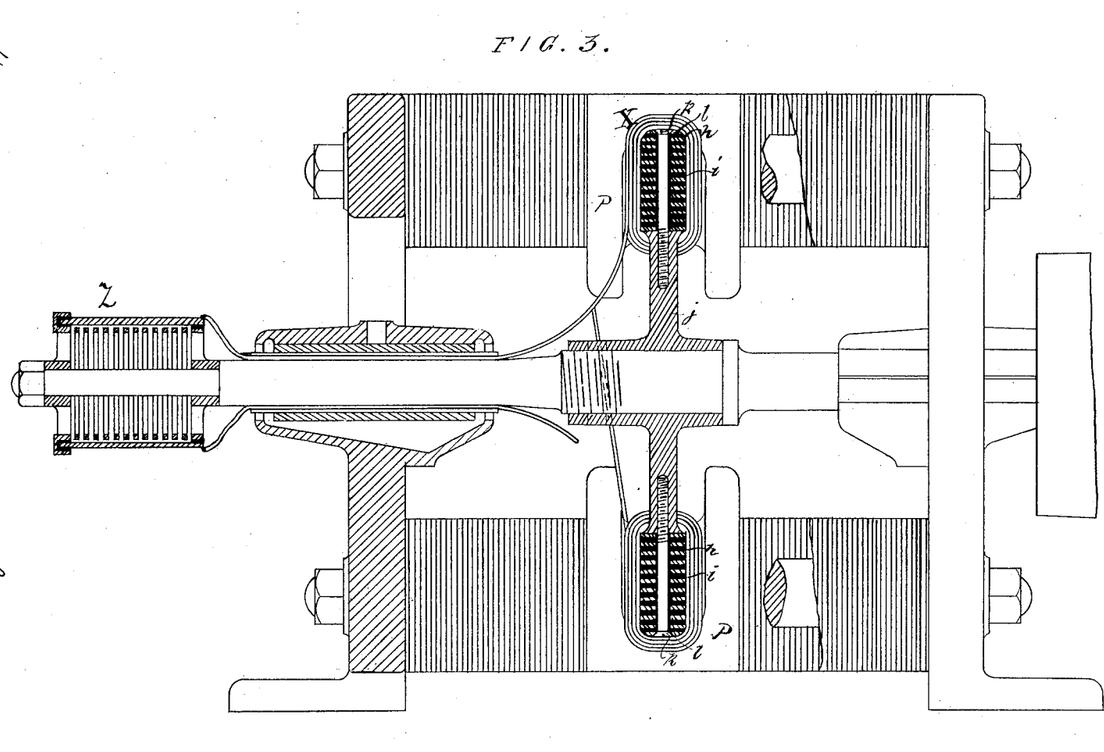
Fig. 3 is an elevation, partly in section, of a four-pole dynamo-machine according to my invention.

Fig. 3 is a longitudinal sectional elevation of the complete dynamo-electric machine; but I will at present only refer to this figure to explain the armature which is therein seen in section. A number of thin rings or hoops of soft iron, $h\ h$, whose width is the thickness of the ring-disk (except near the periphery where the rings are made a little narrower) are constructed of graduated diameters. These are built up into a ring-disk by arranging them concentrically, one within the other, with a small space separating each ring or hoop from the adjacent ones. The separation is effected by suitable insulating material—such as mica. This insulating material may be in the form of rings, or it may be (and I prefer that it should be) merely in the form of slips placed at intervals, thus leaving air-spaces between the rings or hoops to facilitate cooling. A method I find convenient is shown in Fig. 5, where the washers $i\ i$, surrounding the bolts $k\ k$, are the separating-pieces. The ring-disk so constructed is mounted in the following manner: A hub, $j$, of brass, gun-metal, or other suitable metal or alloy is fixed into the ring-disk by bolts $k\ k$ passing through holes drilled radially through the group of rings or hoops and screwed into the arms of the hub, the outer ends of the bolts being made flush or nearly so with the periphery of the ring-disk.

Figure 6:
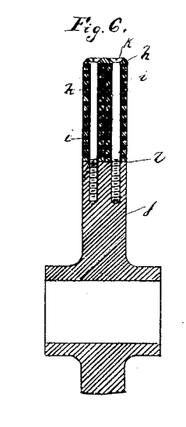

To prevent the bolts from electrically connecting the various hoops of the ring-disk, the holes through which they pass are fitted with bushes or tubes $l\ l$ of a dense unyielding non-conducting material, lignum-vitæ being a suitable substance. I also fit the ring-disk with projecting pegs $g\ g$ for the purpose of separating and supporting the coils near the periphery and for convenience of winding, as in the armature shown in Figs. 1 and 2. Sometimes I make the armature of two or more sets of hoops built up as above, and placed side by side, as shown in Fig. 6, with a slight air-space or sheet of suitable insulating material—such as asbestus paper—between them.

Although the above-described armatures may be used with two magnetic field-magnet poles, I prefer to employ some multiple of two, depending on the size of the armature.

Figure 4:
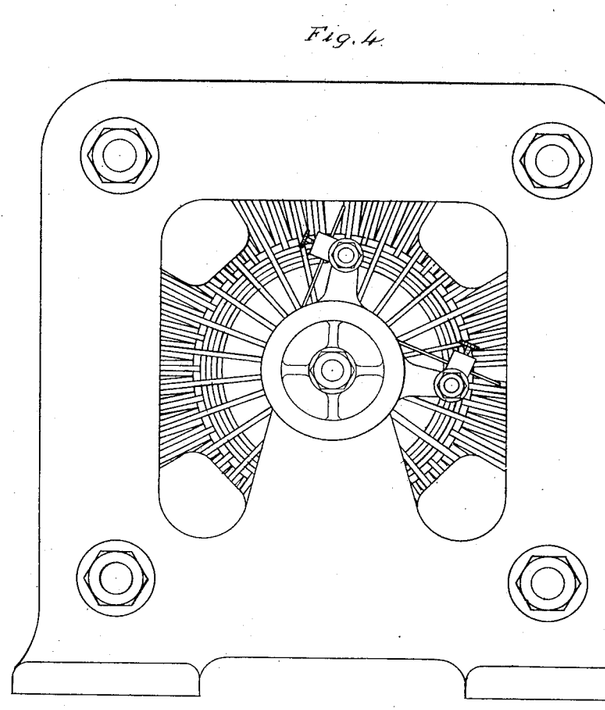
Fig. 4, an elevation of the same.

Figs. 3 and 4 show a dynamo-electric machine in section and elevation, constructed according to my invention and having four poles, P P P P, alternately of north and south polarity. These field-magnet poles are grooved or hollowed out to a ∪-shaped cavity for the purpose of enabling them to act directly on the sides as well as the periphery of the ring-disk. Thus almost the whole of the wire on the armature is exposed directly to strong magnetic influence, and is utilized to the fullest extent.

The connections Y, and the commutator Z with its internal ring-connections, $c\ c\ c$, are described in greater detail hereinafter.

In machines of this type as hitherto usually constructed with any even number of poles greater than two, the current has usually been collected from the commutator by separate brushes or their equivalents pressing upon parts of the commutator corresponding to the neutral points of the armature, or points where the generation of current changes in direction, such neutral points being equal in number to the magnetic poles employed.

Having to connect, support, adjust, and keep in order a number of individual brushes has been a source of great inconvenience and trouble, and according to my invention I simplify the collection of the current and reduce the number of brushes to two by connecting the equipotential points of the armature with one another by means of conductors—such as rings, bars, or their equivalents—such connections being made between the conductors which connect the armature and the commutator, or between the commutator-segments or plates themselves, in the manner described below. Thus as the commutator-segments of all the coils which are in the same phase of excitation, and are therefore equipotential, are connected, only one pair of brushes is required to collect the current.

Figure 7:
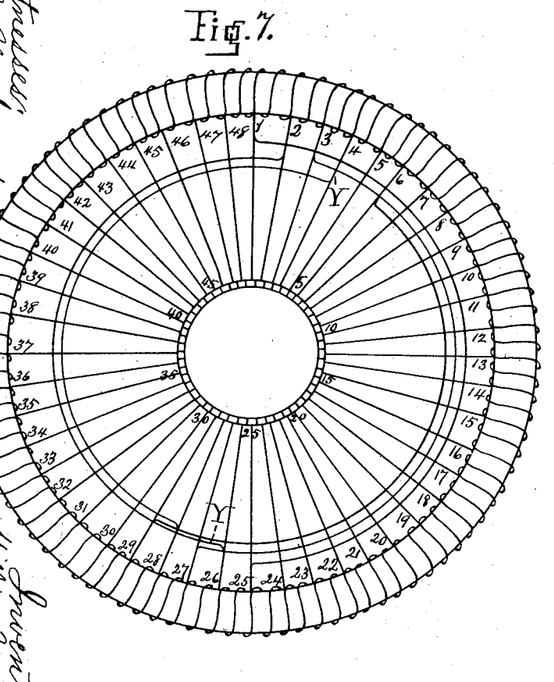
Figure 8:
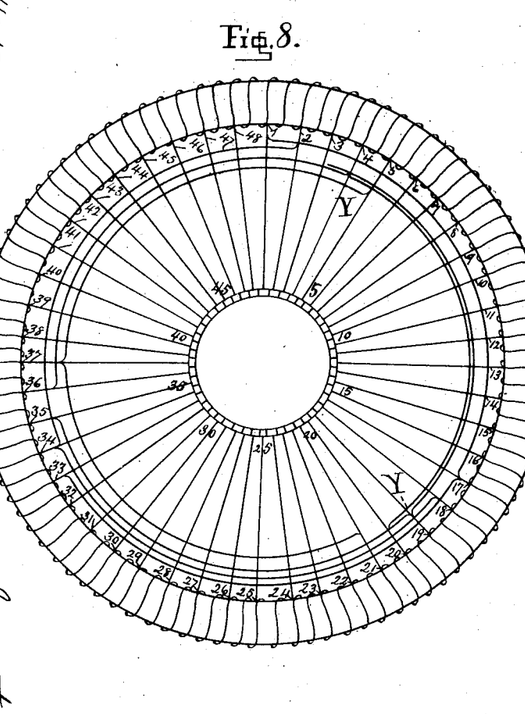

The connections Y for an armature having forty-eight coils or equivalent divisions are shown diagrammatically in Figs. 7, 8, and 9. In the figures for the sake of clearness only part of the connections are shown. Fig. 7 illustrates the connections for an armature revolving in the magnetic fields produced by four equidistant poles alternately north and south, the coils being connected in the order 1 25, 2 26, 3 27, 4 28, 5 29, &c. This is conveniently done in the process of winding as follows: The two wires at each junction are connected in the customary manner. One of the wires is then carried to the proper segment of the commutator, and the other is made to meet a similar end from a diametrically-opposite junction. Fig. 8 illustrates the connections for a similar armature used with six magnetic poles, the junctions of the coils being connected in the order 1 17 33, 2 18 34, 3 19 35, 4 20 36, &c. Fig. 9 illustrates the connections for an armature revolving in the fields produced by eight equidistant poles, the junctions of the coils being in the order 1 13 25 37, 2 14 26 38, 3 15 27 39, 4 16 28 40, &c.

Instead of using the armature-wires themselves to make the connections, sometimes I employ rings or strips of copper attached to the junctions or to the armature-leads, substantially in the same way. In cases where the armature is already wound and connected this enables the alteration to be made easily and quickly. By the above-described means I am enabled to collect the current in each case by employing two brushes only. I do not, however, limit myself to one pair of brushes in all cases—as, for instance, if eight poles are employed, four brushes may be used, the armature being so joined up that two of the four equipotential + "neutral points" are connected, the current being collected from them by a brush pressing on any one of the corresponding segments, the other two + neutral points being also joined together and the current collected by a second brush pressing on any one of the corresponding segments, two brushes being similarly used for the four negative (—) neutral points.

It will be understood from the foregoing that Figs. 7, 8, 9, besides illustrating the connections of the armature when four, six, eight poles, respectively, are used, two brushes being employed in each case, serve also as diagrams of the connections of the armature when eight, twelve, and sixteen poles, respectively, are employed, four brushes being used in each case.

Figure 13:
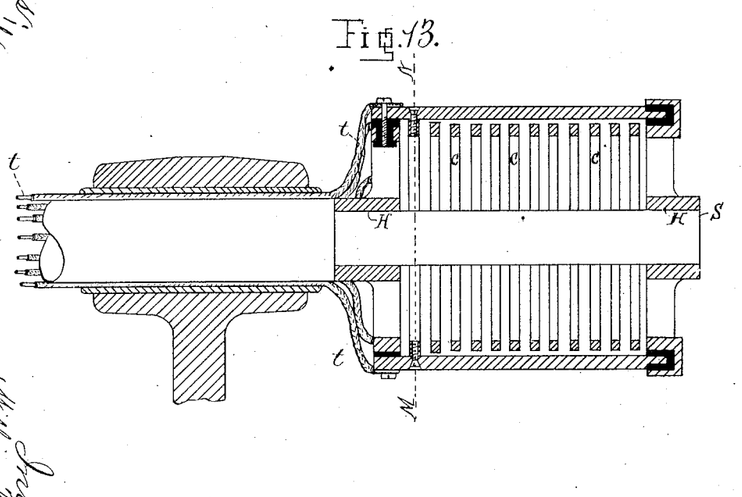
Figs. 13 and 14 are sections at right angles to each other of the commutator.
Figure 14:
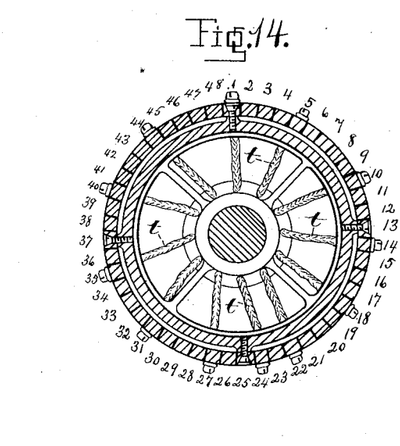

Figs. 13 and 14 show the construction of the commutator of the machine with internal connections, Fig. 13 being a sectional elevation, and Fig. 14 a section through M N. The commutator in these figures is for a machine with eight poles and two brushes, and accordingly the commutator-segments are joined in the order 1, 13, 25, 37, 2, 14, 26, 38, 3, 15, 27, 39, &c. In Fig. 3 a commutator according to this principle is seen as applied to a machine with four poles, the segments in this case being joined in the order 1 25, 2 26, 3 27, &c.

Figure 10:
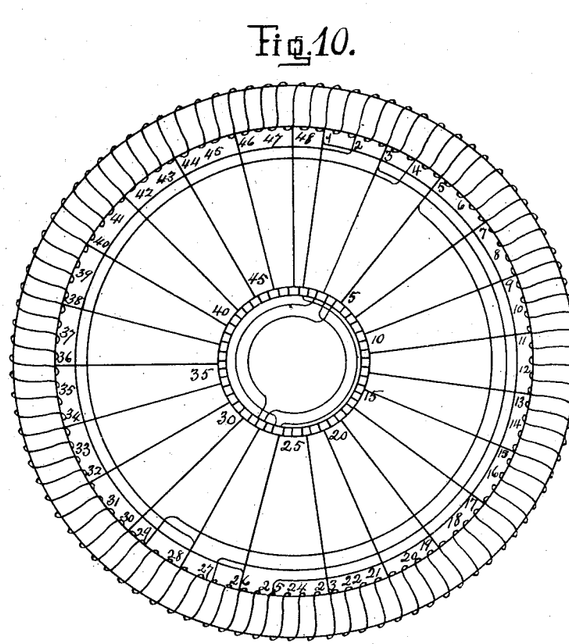
Figs. 10, 11, and 12 illustrate my method of connecting the equipotential segments of the commutator under like conditions.
Figure 11:
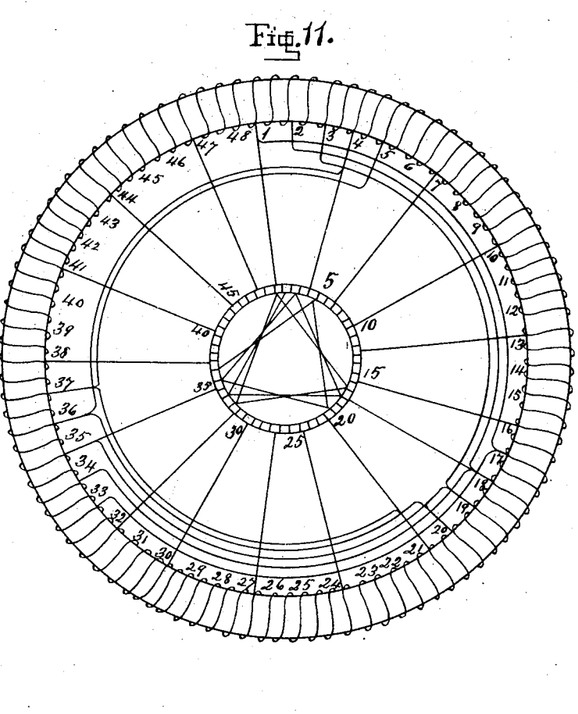
Figure 12:
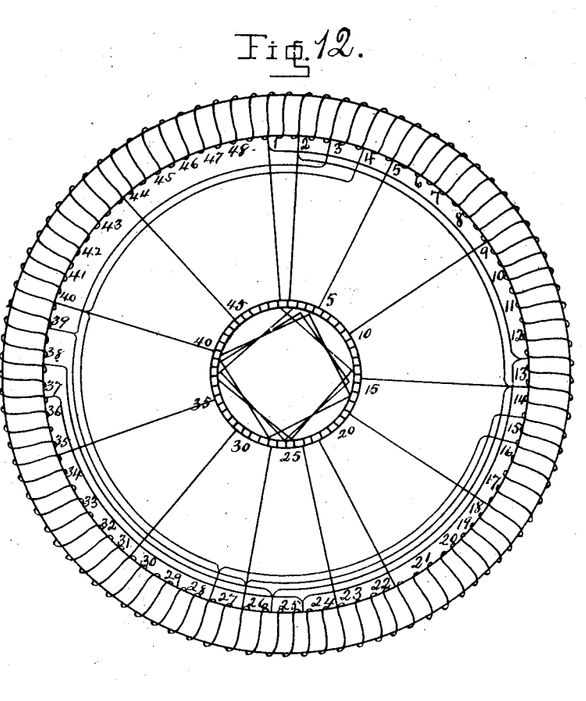

It will not be necessary to describe this commutator further than to say that S is the shaft on which armature and commutator are mounted; H H, the hubs supporting the commutator, and C C C the internal cross-connections joining the segments. When I place the commutator inside the bearing—i. e., between the armature and the bearing, the connections being made between the commutator-segments—the armature-leads are led direct to the commutator-segments without being previously connected, as described with reference to Figs. 7, 8, and 9. It is, however, for several reasons more convenient to place the commutator outside the bearing, as seen in Figs. 3 and in 13, and this necessitates bringing the wires or other conductors from the armature to the commutator through a hollow shaft or sleeve-bearing. It has hitherto been customary in such cases to bring all the armature-leads through the shaft; but I construct my machine in such a manner as to reduce this number considerably, and thereby lessen the difficulty, electrical and mechanical, of carrying a large number of conductors through such a bearing. Thus with four, six, and eight poles, I reduce the number to one-half, one-third, and one-fourth, respectively. This is accomplished by making the armature-connections as shown with reference to Figs. 7, 8, and 9, and also between the commutator-segments in the same order, and then continuing only one conductor from each group of connected armature-coils to the commutator. This reduction of the number of leads between the armature and the commutator is shown diagrammatically in Figs. 10, 11, and 12, which illustrate the connections for armatures revolving in fields formed by four, six, eight poles, respectively, two brushes being used in each case, or eight, twelve, sixteen poles, using four brushes in each case. For the sake of clearness, part only of these connections are shown in these figures, with the exception of the leads between armatures and commutators, which are all shown.

Figs. 3 and 13 show how this improvement is applied practically.

In Figs. 13 and 14 (which show a commutator having forty-eight segments for an armature having a like number of coils revolving in a field having eight poles) only twelve leads are brought to the commutator from the armature instead of the whole forty-eight. These twelve leads are marked $t$. In Fig. 13, which is a longitudinal section of the commutator showing a sleeve-bearing with the leads passing through it, only part of the leads are seen; but in Fig. 14, a cross-section of the commutator, the whole of the twelve leads are clearly shown. It will be seen that with any even number of field-magnet poles other than two the number of conductors necessary between armature and commutator is equal to the total number of armature-coils divided by half the number of poles; also, that the armature-coils should be a multiple of the field-magnets.

I would have it understood that the term "dynamo-electric machines" includes both electric generators and motors, and that in exciting the field-magnets I do not limit myself to any particular method.

What I claim is—

1. In a dynamo-electric machine in which the armature revolves in a magnetic field or fields resulting from the influence of four or some greater even number of poles, the combination of electrical connections between the terminals of the coils that are in a state of equal potential, electrical connections between the bars or segments of the commutator which are in a state of equal potential, and electrical connections joining each of the first-mentioned connections to the corresponding one of the second set, substantially as and for the purposes set forth.

2. In a dynamo-electric machine, an armature composed of a number of coils having electrical connections joining the coils of equal potential, in combination with the conductors $t$, rings $c$, and bars or segments, such as shown, whereby the current from those coils which are in the same phase of excitement is conveyed to the commutator through one lead, substantially as described and set forth.

3. In a dynamo-electric machine, the combination of an armature-core formed of a number of magnetic plates, disks, rings, or hoops held together in such a way that they are insulated from each other both electrically and magnetically, and forming part of an armature which revolves in a magnetic field or fields resulting from the influence of four or some greater even number of poles and electrical connections between the terminals of those coils of the armature that are in a state of equal potential, substantially as and for the purposes set forth.

4. In a dynamo-electric machine, the combination of an armature-core formed of a number of magnetic plates, disks, rings, or hoops held together in such a way that they are insulated from each other both electrically and magnetically, and constituting part of an armature which revolves in a magnetic field or fields resulting from the influence of four or some greater even number of poles, and electrical connections between those bars or segments of the commutator that are of equal potential, substantially as and for the purposes herein set forth.

5. In a dynamo-electric machine, the combination of an armature-core formed of a number of magnetic plates, disks, rings, or hoops held together in such a way that they are insulated from each other both electrically and magnetically, and constituting part of an armature, which revolves in a magnetic field or fields resulting from the influence of four or some greater number of poles, electrical connections between the terminals of the coils that are in a state of equal potential, electrical connections between the bars or segments of the commutator which are in a state of equal potential, and electrical connections joining each of the first-mentioned connections to the corresponding one of the second set, substantially as and for the purposes set forth.

6. In a dynamo-electric machine, coils, in combination with the ring-disk provided with holes near its outer circumference, and the pegs inserted in said holes for the purpose of separating and convenience in winding the coils and for obtaining increased air-circulation between the coils on the withdrawal of said pegs, substantially as described.

WILLIAM MORRIS MORDEY.

Witnesses:
 EDWD. N. HOBBS,
 J. EDWD. BEESLEY,
*Both of 2 Pope's Head Alley, Cornhill, London, Gents.*